June 30, 1931.　　T. H. REDFIELD　　1,812,553
PIPE UNION
Filed Aug. 18, 1927
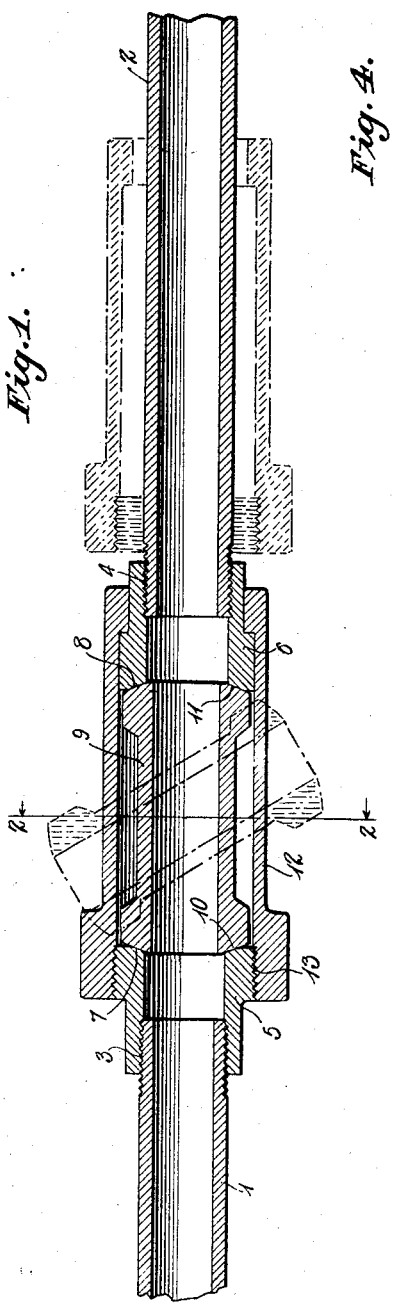
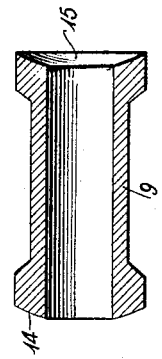
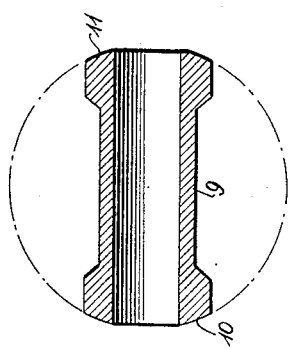
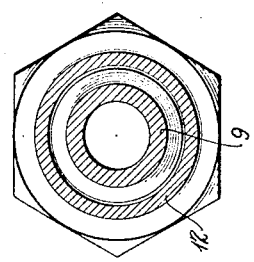
INVENTOR.
Theodore H. Redfield
BY
ATTORNEYS Patented June 30, 1931

1,812,553

UNITED STATES PATENT OFFICE

THEODORE H. REDFIELD, OF PRINCETON, NEW JERSEY

PIPE UNION

Application filed August 18, 1927. Serial No. 213,889.

This invention relates to pipe unions.

In the conventional type of pipe union the adjacent extremities of the pipe sections are usually abutingly associated and consequently when the casing used to secure the same together has been threadedly removed the adjacent extremities of the pipe sections remain rigid with the result that it is necessary to use special devices such as pinch bars or hydraulic jacks to get them apart.

The primary object of the present invention is to provide what is termed a filler to be interposed between the adjacent pipe sections and of such a character that it may be readily rolled out from between the pipe ends upon the removal of the casing, thus permitting the pipe to be free for unscrewing or swinging open.

More specifically the present invention comprehends a filler having a neck portion of reduced diameter and spherical shaped male ends adapted to be received by seating elements having spherical recesses therein carried by the adjacent pipe ends. This filler is virtually the center of the middle zone of the sphere, thus facilitating its ready removability by simply a rolling action.

Numerous other characteristics of the invention will be apparent to those skilled in the art from the reading of the following specification in conjunction with the drawings attached hereto and forming a part hereof, in which:

Fig. 1 is a longitudinal sectional view of an entire pipe joint or coupling embodying this invention, Fig. 2 is a sectional view taken on line 2—2 of Fig. 1, Fig. 3 is a detail sectional view of the type of filler illustrated in Fig. 1, Fig. 4 is a similar view to Fig. 3, but discloses a modified form of filler.

Referring now more specifically to the drawings, the numeral 1 indicates a pipe end and numeral 2 an adjacent pipe end. These pipe ends are screw threaded as at 3 and 4 for threadedly receiving what I term my seating elements 5 and 6. These seating elements are provided with female ends or recesses of substantially spherical formation as shown by reference numerals 7 and 8. The filler adapted to fit between the adjacent pipe ends comprises a reduced intermediate neck portion 9 and spherical ends 10 and 11. This spherical filler is virtually the center of the middle zone of a sphere having a diameter substantially greater than the maximum diameter of the filler. When the casing 12 is removed as shown in Fig. 1 the filler may be simply rolled out of position as indicated in dotted lines, thus leaving the pipe ends free for unscrewing or swinging apart if desired. The spherical recesses provided in the seating elements conform to the shape of the spherical ends of the filler as is clearly shown. One of the seating elements is exteriorly threaded as at 13 to threadedly receive the end of the casing, thus maintaining the filler in proper position.

The structure above described is preferable in actual operation, that is to say, the idea of having a filler with the spherical faces interfitting with the depressions or recesses in the seating devices secured to the pipe ends and adapted to be rolled out of engagement with slight effort, but my invention also comprehends the use of a filler having ends shaped as shown in Fig. 4, with one male end 14 and one female end 15.

I realize that many slight variations in construction and arrangement of parts may be made without departing from the spirit of the invention as defined in the following claims.

What I claim is:

1. A pipe connection comprising seating elements secured to the adjacent ends of pipes, a filler formed as the center of the middle zone of a sphere having a diameter substantially greater than the maximum diameter of the filler constituting a separating device mounted between the pipe sections and having interfitting engagement with the seating elements, said filler having end faces of spherical shape to permit it to be rocked to disengage it from the seating elements, and a casing threadedly secured to at least one of the pipe sections and enveloping the filler when in operative position.

2. Means for connecting adjacent pipe sections together, comprising seating elements secured to the pipe sections, a filler tube formed as the center of the middle zone of a sphere having a diameter substantially greater than the maximum diameter of the filler fitting between the sections and interfittingly engaging the seating elements to thereby separate he pipe ends from each other, said filler comprising spherical head portions whereby to permit its ready rotation out of engagement with the seating elements.

3. A pipe connection, comprising a filler of hollow formation formed as the center of the middle zone of a sphere having a diameter substantially greater than the maximum diameter of the filler adapted to be placed between and separate the adjacent ends of the pipe sections to be connected, said filler having spherical ends interfittingly engaging the ends of the pipe and being adapted to be rolled out of or into engagement therewith to connect or disconnect the pipe sections.

4. A pipe connection, comprising a hollow filler formed as the center of the middle zone of a sphere and adapted to space the adjacent ends of the pipe sections from each other a distance substantially greater than the maximum diameter of the filler and having spherical faces interfittingly engaging the extremities of the pipe sections and rockable into or out of engagement therewith, said filler having a reduced neck portion and a casing or sleeve adapted to be detachably secured to the adjacent pipe connections to envelop the filler.

5. A filler for use as a pipe connection of the character described, having an end face formed on the arc of a circle throughout its entire area with the axis of the circle located within the confines of the filler and adapted to interfittingly engage the pipe section to permit ready disconnection of the filler from the pipe section, said filler having a greater axial length than diameter.

In testimony whereof I affix my signature.

THEODORE H. REDFIELD.